Patented Aug. 28, 1951

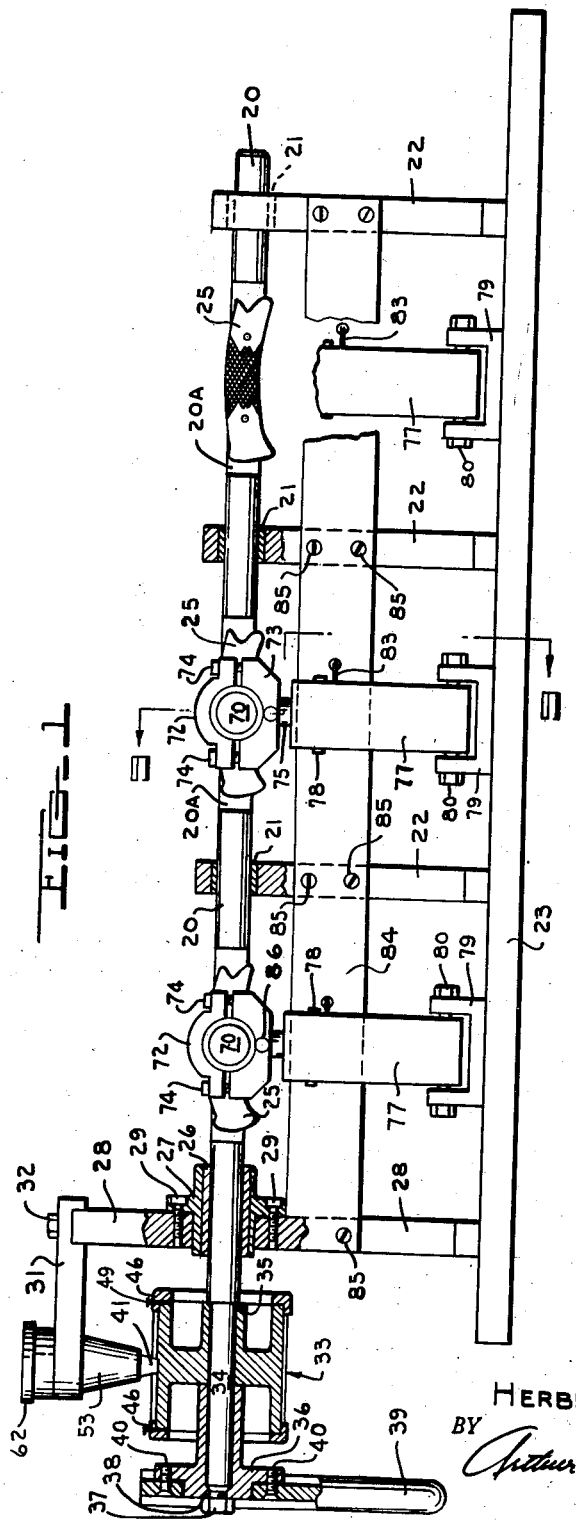
Aug. 28, 1951 — H. F. DIES — 2,565,914
PATTERN REPRODUCING MACHINE
Filed Nov. 25, 1946 — 4 Sheets-Sheet 1
INVENTOR.
HERBERT F. DIES
BY Arthur M. Smith
ATTORNEY Aug. 28, 1951  H. F. DIES  2,565,914
PATTERN REPRODUCING MACHINE
Filed Nov. 25, 1946  4 Sheets-Sheet 2
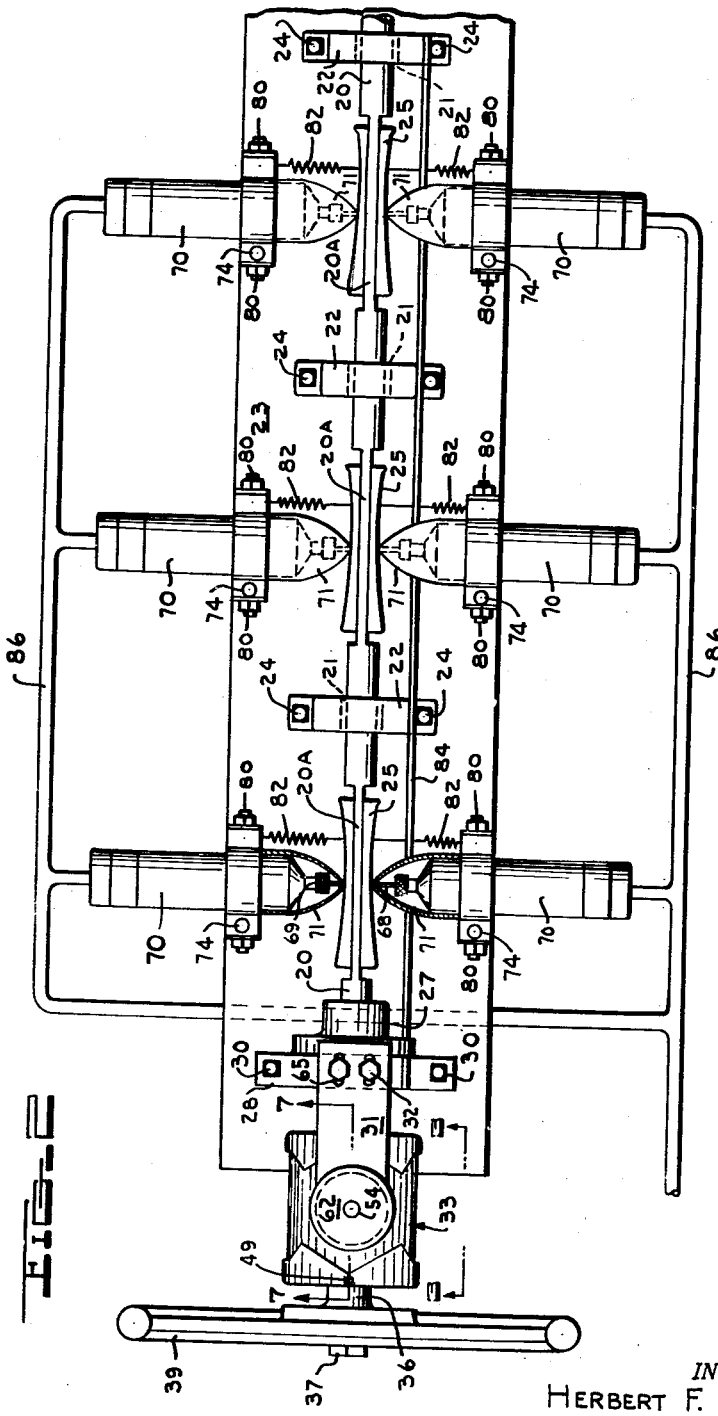
INVENTOR.
HERBERT F. DIES
BY
ATTORNEY

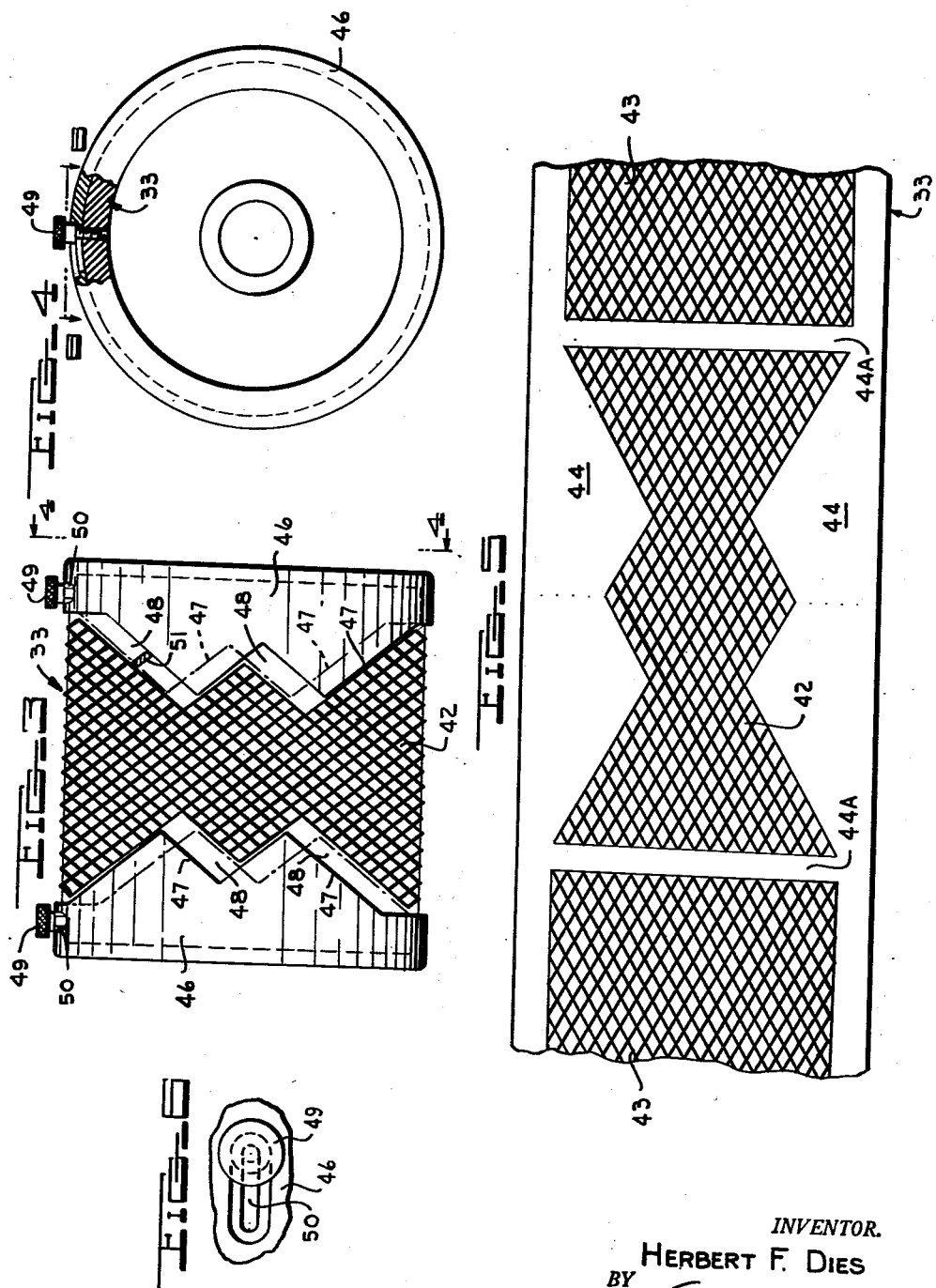

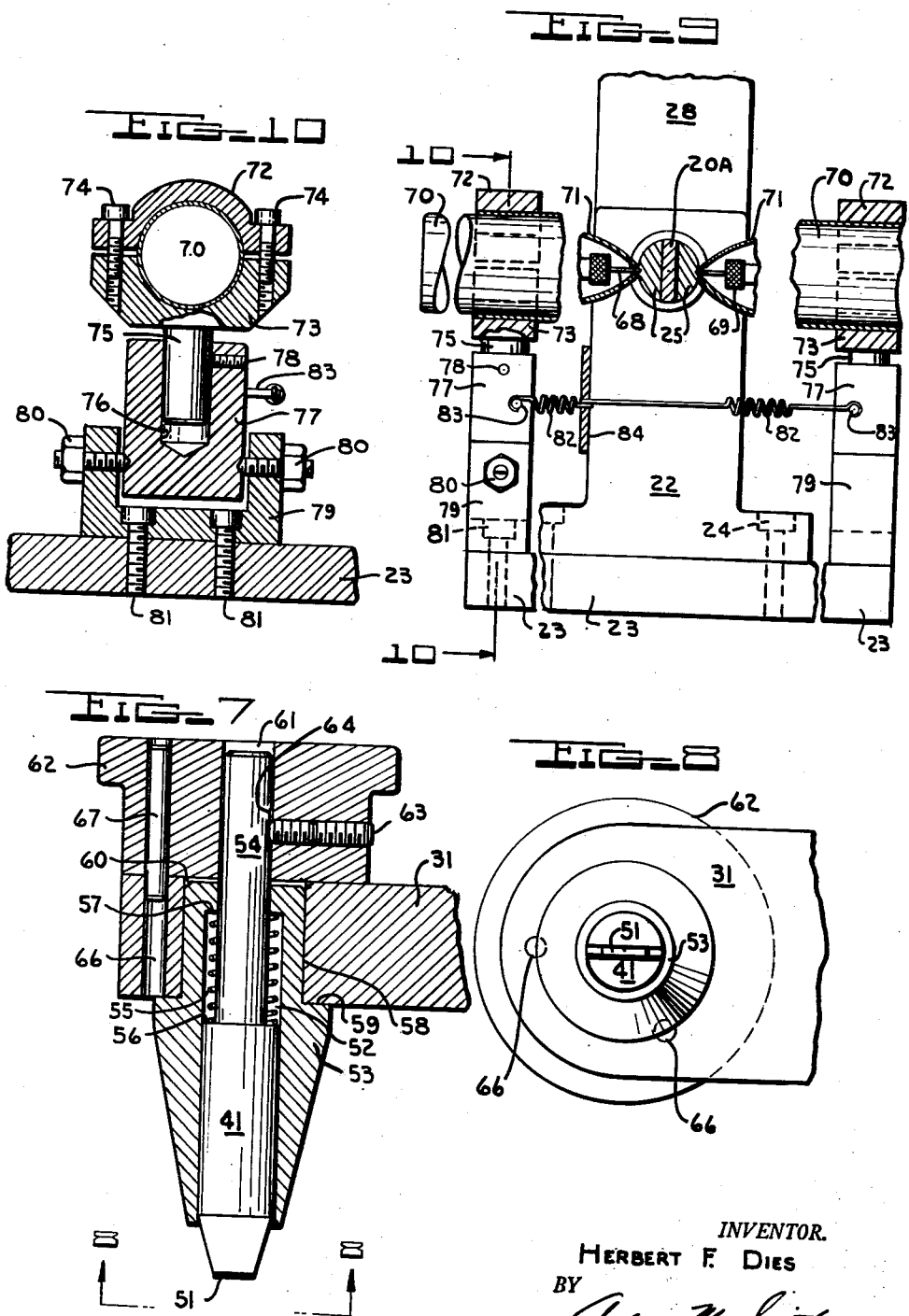

2,565,914

UNITED STATES PATENT OFFICE 2,565,914

PATTERN REPRODUCING MACHINE

Herbert F. Dies, Detroit, Mich., assignor to Hurd Lock & Manufacturing Company, Detroit, Mich., a corporation of Michigan Application November 25, 1946, Serial No. 712,061

4 Claims. (Cl. 33—22)

The present invention relates to a pattern reproducing machine adapted to reproduce a pattern on the surface of a work piece in accordance with a master pattern. The machine, by way of example, is particularly but not exclusively adapted for cutting a checkered or knurled pattern on such articles as gun stocks, pistol grips, handle grips for fishing or casting rods, and the like.

It has previously been customary to cut grip patterns on various odd-shaped articles as pistol grips or casting rod handle grips by hand methods utilizing hand tools, or to form such patterns by molding processes. For articles of wood or other material not suitable for molding, the hand carving practice is tedious and costly, frequently results in imperfect work, and makes difficult the standardization of duplication of a pattern or design in quantity production.

Accordingly, primary objects of the present invention are to provide a pattern reproducing machine adapted to mount a pattern marking tool and a work piece so as to permit relative movement therebetween in correspondence with the locus of a predetermined pattern, which preferably but not necessarily may be defined by the relative tracing movement between a pattern follower or tracing tool and the surface of a master pattern, the machine being adaptable to the quantity production of a uniform and precise design simultaneously on the surface of each of a battery of similar work pieces in accordance with the plan of said master pattern.

Other objects of the present invention are to provide a pattern reproducing apparatus in which a marking instrument of the cutting or engraving type is guided over the surface contours of a work piece while in operative engagement therewith, and in which guard means for said marking instrument are provided to limit the depth of a relief pattern made in the work piece, and in which means including an adjustable pattern follower or tracing tool are provided to trace the relief portions of a master relief pattern and to guide said marking instrument in its movement over the surface contours of the work piece.

Further objects of the present invention are to provide a pattern reproducing machine which comprises a pattern drum having a master pattern on the surface thereof, a pattern follower therefor, and mountings for said pattern drum and pattern follower to permit relative translatory and rotatory motion therebetween; and to provide a collar means adapted to be adjustably mounted on said pattern drum to serve as a raised limiting boundary for the relative movement of said pattern follower over the surface of said master pattern thereby to provide sharp limits for the relative movement of the aforesaid pattern marking tool with respect to the said work piece.

Other objects of this invention will appear in the following description and appended claims, reference being had to the accompanying drawings forming a part of this specification wherein like reference characters designate corresponding parts in the several views.

Fig. 1 is a partially sectioned side elevation of a pattern reproducing machine embodying the present invention, showing the machine arranged to reproduce a checkered pattern on a work piece and showing parts of the machine broken away.

Fig. 2 is a partially sectioned fragmentary top plan view of the machine shown in Fig. 1, showing the machine in position for operating on three pairs of work pieces, in the present instance, handle grips.

Fig. 3 is an enlarged elevation of the pattern drum schematically indicating a knurled pattern on the surface thereof and showing the adjustable end collar members, the view being taken substantially along the line 3—3 in the direction of the arrows, Fig. 2.

Fig. 4 is an end view of the pattern drum with the parts broken away, taken substantially along the line 4—4 in the direction of the arrows, Fig. 3.

Fig. 5 is a fragmentary flattened or roll-out view of the drum shown in Figs. 3 and 4, with end collars removed and with the knurled pattern schematically indicated.

Fig. 6 is a fragmentary elevation of that portion of the drum indicated by the line 6—6 and taken in the direction of the arrows, Fig. 4.

Fig. 7 is an enlarged section of the tracing tool or pattern follower with detent, taken substantially along the line 7—7 in the direction of the arrows, Fig. 2.

Fig. 8 is a fragmentary bottom plan of the pattern follower and holder, taken substantially along the line 8—8 in the direction of the arrows, Fig. 7.

Fig. 9 is a fragmentary vertical section taken in the direction of the arrows substantially along the staggered line 9—9 of Fig. 1.

Fig. 10 is a vertical section of the mounting for the cutting tool motor, taken substantially on the line 10—10 in the direction of the arrows, Fig. 9.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

The present invention provides a machine to hold a work piece and a pattern marking tool in a desired relationship with each other so that the pattern marking tool will mark a pattern on the surface of the work piece as the two are moved relative to each other in accordance with a predetermined master pattern. In a preferred embodiment of the present invention, relative movement between the work piece and the pattern marking tool is determined by the relative movement between a cam pattern on the surface of a drum and a pattern follower, a suitable operatable linkage being provided to control the former motion in accordance with the latter motion.

Referring to the drawings, and in particular to Figs. 1 and 2, an understanding of the scope and operation of my invention will be more readily understood in reference to the following description of a particular embodiment thereof, which by way of example is utilized to checker the handle grips adapted for use on a casting rod handle. It is to be understood, however, that surface ornamentation may be formed on other types of contoured work pieces by the use of a machine embodying the present invention. A rotating and oscillating work holding shaft 20 is mounted in the sleeve bearings 21 within the upright bearing supports 22, which latter are secured by the bolts 24 to the base 23 of the pattern reproducing machine. The work pieces to be ornamented, in this case the handle grips 25, may be of wood, plastic or other material, and are suitably secured to the flattened portions 20A on opposite sides of the shaft 20 and are movable therewith.

The shaft 20 extends through and is supported by the sleeve bearing 26 within the collar 27, which latter is secured to the upright 28 by the bolt 29. The upright 28 is secured to the base 23 by the bolts 30 and supports the horizontal bracket 31 to which it is attached by the bolts 32.

The pattern drum, indicated generally by the numeral 33, provides a master pattern in relief on its surface, fits over the reduced portion 34 of the shaft 20 underlying the horizontal bracket 31, and rests against the shoulder 35 adjacent the reduced portion 34. The collar 36 caps the reduced end 34 and clamps the drum 33 between it and the shoulder 35. The collar 36 is suitably keyed to the drum 33 and reduced end portion 34 so that the shaft 20, the drum 33 and the collar 36 are movable together as a unit. The collar 36 is securely held in place by the nut 37 which screws on the threaded portion 38 at the end of the shaft 20.

Both rotatory motion about and translatory motion along the longitudinal axis of the shaft 20 is accomplished by movement of the half-wheel operating handle 39 which is secured to the collar 36 by the plurality of screws 40. The absence of the upper half of the operating handle 39 permits the operator to observe the pattern surface of the drum 33 and to guide the movement thereof relative to the fixed pattern follower or tracing member 41.

Figs. 3, 4, 5 and 6 show details of the pattern drum 33 and the master pattern 42 as utilized in the preferred embodiment under discussion. The master pattern 42 determines the pattern to be formed on the surfaces of the work pieces 25 in the manner described below and comprises a knurled or checkered design in relief on the surface of the drum 33.

In the present instance, the entire surface of the drum 33 is knurled essentially as shown in the knurled portion 43 of the rolled-out view of the drum 33, Fig. 5. Then the excess portions of the knurling are suitably cleaned off, as by milling or grinding, to form the smooth surface 44, which includes the smooth strips 44A, to define the limits of the master pattern 42. Only a portion of the surface of the drum 33 is required for the desired cam pattern 42 in the embodiment shown. Hence the knurled portion 43 provides a reserve which may later be shaped to a desired overall pattern by cleaning off the excess portion thereof when the pattern 42 becomes worn or otherwise unusable. It should be observed that the knurling of Figs. 3 and 5 is merely indicated schematically. The white diamonds represent raised portions of the knurling and the black cross lines represent the grooved portions which are substantially on the same level as the smooth surfaces 44 and 44A.

An important feature of the present invention to be observed is in the two collars 46 which are adjustably secured at opposite ends of the drum 33 to provide raised boundary stops or positive limiting points of contact 47 to contact and limit the relative tracing movement of the follower 41 near the borders of the cam pattern 42. The adjacent boundary stop edges 47 of the two collars 46 are shaped in accordance with the desired boundaries of the pattern to be formed on the workpieces 25 and are coordinated with the overall shape of the knurled pattern 42 to provide the smooth strips 48 of the smooth surface 44 at the end of each lineation of said knurled pattern 42.

One possible position of the tracing edge 51 of the follower 41, Fig. 7, is shown in Fig. 3 within the strip 48 wherein the tracing edge 51 is guided broadside relative to the drum 33 along the strip 48 by a portion of the stop edge 47, which latter extends at an angle to the longitudinal axis of the tracing edge 51 and its relative movement along the lineations parallel thereto. Other portions of the edges 47 extend parallel to the longitudinal axis of the tracing edge 51 and the direction of its relative movement along the lineations of the pattern 42 and serve as guides to control the relative movement of the edge 51 and to develop a straight line border for the corresponding portions of the pattern being cut or otherwise marked on the workpiece 25.

The position of the tracing edge 51, Fig. 3, is reached by repeatedly tracing down one lineation and up the next in the direction parallel to the longitudinal axis of the tracing edge 51. Broadside movement from one lineation to the next is alternately accomplished in the strips 48 and 44A, with the result that a discontinuous movement of the tracing edge 51 along the strip 48 causes a broken line to be cut at the border of the pattern in the workpiece 25 along that portion of the pattern boundary which corresponds to the strip 48. At the portions of the stop edge 47 which are parallel to the longitudinal axis of the tracing edge 51, no strip 48 exists.

Thus the edge 51 will be guided along the border of the pattern 42 adjacent the stop edge 47 and a corresponding continuous straight line margin will be cut for the pattern in the workpiece 25.

In the usual case, the point on the workpiece 25 at which the pattern is being cut will be indicated on the master pattern 42 by the position of a particular portion of the tracing edge 51, such as the leading tip, trailing tip, or midportion thereof. In the present example, it is feasible to associate the position in which the pattern is being cut on the workpiece 25 with the leading tip of the tracing edge 51 as the tracing edge 51 moves upward along the lineations of the pattern 42. When the tracing edge 51 makes its discontinuous broadside movement along the strip 48, Fig. 3, the position on the pattern 42, which corresponds to the discontinuous cut being made in the pattern on the work piece 25, will lie along the marginal lineation parallel to the strip 48 at the border of the pattern 42.

After all of the parallel lineations of the pattern 42 in one direction have been cut in the workpiece 25, the follower edge 51 is rotated by means to be described below and aligned with the parallel lineations of the cam pattern 42 which extend in the other direction. The broken border lines which were previously cut in the pattern on the workpiece 25 may now be retraced and completed upon rotating and adjusting the collars 46 so that the edges 47 occupy the dotted positions shown in Fig. 3. The collars 46 are held in adjusted position on the ends of the drum 33 by thumbscrews 49 which pass through the elongated slots 50 in the collar 46 and are engaged with the screw threaded openings in the drum 33.

Figs. 7 and 8 show details of the construction and operation of the pattern follower 41 in its supporting structure. The follower 41 is provided with a thin, flattened and elongated tracing tip 51 which tracks along the lineations of the master cam pattern 42. Other tracing means suitable for tracking along a grooved or raised lineation will suggest themselves to the skilled mechanic.

The follower 41 fits within an opening 52 in the holder 53. A reduced shaft 54 of the follower 41 provides space within the opening 52 for the spring 55 which is compressed between the shoulder 56 of the follower 41 and the base 57 of the holder 53. A reduced portion 58 of the holder 53 fits within the opening 60 of the bracket 31 and provides the shoulder 59 which rests against the base of the bracket 31. The shaft 54 extends through an opening provided therefor in the base 57 and projects into the opening 61 of the handle 62, which latter provides the self-locking double setscrew 63 which projects into the vertical groove 64 of the shaft 54 and prevents rotation of the follower 41 relative to the handle 62, yet permits vertical movement of the follower 41 against tension of the spring 55 to the extent of the limitation imposed by the groove 64. It is at once apparent that by proper positioning of the drum 33 with respect to the bracket 31, the desired pressure contact between the tracing tip 51 and the cam pattern 42 may be achieved. Minor vertical adjustment of the follower 41 with respect to the cam pattern 42 is provided by the resiliency of the spring 55. Minor horizontal adjustment between the cam pattern 42 and the follower 41 is permitted by the elongated bolt holes 65 in the bracket 31 for the bolts 32, Fig. 2.

In order to follow the cam pattern 42 on the drum 33, a detent is provided which allows the tracing tip 51 to be selectively aligned at predetermined angles with the lineations of the cam pattern 42 and the positions of the edges 47 of the collars 46. In the particular master pattern 42 here shown as an example, the lineations of the knurling cross each other at approximately 60 degree angles. In order to adapt the tracer tip 51 to follow each of the grooved paths of the pattern 42, the follower 41 may be turned through an arc about its longitudinal axis and locked in set positions which are governed by the index locating holes 66 provided in the bracket 31 for the downward projecting indexing pin 67 secured within the handle 62. Indexing of the follower 41 is accomplished by lifting the handle 62, and therewith the pin 67 from one of the index locating holes 66, against the tension of the spring 55 and by turning the handle 62 until the pin 67 indexes at the other of said indexing holes 66.

Figs. 9 and 10 show details of the operation and construction of the pattern marking instruments which in this case are the rotary cutting tools 68 held by the chucks 69 of the pneumatic motors 70. Another important feature of the present invention is indicated by the slightly blunted bullet-shaped nose guards 71 which enclose the nose of each motor 70 and its corresponding cutting tool 68 except for the cutting tip thereof. The cutting tip of each tool 68 is permitted to project through a small circular opening provided therefor without appreciable clearance in the center of the blunt nose of the respective nose guard 71. The extent of the projection of the tool 68 through the nose guard 71 is controlled to regulate the depth of cut to be made by the tool, and thus the cutting depth of each cutting tool 68 is limited to the extent of the projection of its tip beyond the nose guard 71.

The enlarged base of each nose guard 71 fits over its respective pneumatic motor 70 and is clamped thereto by the two-piece collar comprising the upper and lower portions 72 and 73, respectively, which are drawn together by the bolts 74 to clamp the motor 70 and nose guard 71 securely in place. A downward extending shaft 75 of the lower portion 73 of the clamping collar fits into the shaft hole 76 of the pivot block 77 and is held therein by the threaded setscrew 78. The pivot block 77 is pivotally secured on opposite sides to the yoke 79 by means of the threaded pivot pin and nut assemblies 80. The yoke 79 itself is secured to the base 23 by the bolts 81.

Upon pivoting the block 77, the motor 70 and cutting tool 68 movable therewith are moved pivotally toward or away from the work piece 25. Under operating conditions the cutting tool 68 is yieldingly urged toward the surface of the work piece 25 by the spring 82 connected at one end to the stud 83 which projects from the pivot block 77, and connected at the other end to the spring retaining bar 84 which extends essentially the length of the shaft 20 and which is suitably braced and secured to the upright bearing supports 22 by the screws 85. The air pressure lines 86 which energize the pneumatic motors 70 are sufficiently flexible to allow the required movement of said motors 70.

In operation of the above described pattern making apparatus, the work pieces 25 to be checkered are suitably secured to the portions 20A of the shaft 20, the desired pattern is selected for the drum 33, and the follower 41 is adjusted thereto. The operator, standing behind the half wheel 39, is enabled to combine a guided rotatory and translatory motion to the drum 33 so as to keep the follower 41 in its proper track along the lineations of the knurled pattern 42. At the end of each lineation, the tracing tip 51 will rest on one of the smooth strips 44A or 48 so as to permit adjustment thereof to the adjacent lineation. Fig. 3 shows the tracing tip 51 within one of the strips 48 wherein the tip 51 may be moved broadside, or may be rotated by virtue of the aforementioned detent mechanism. The boundary stops 47 of the collars 46 provide regular and even boundaries for the guided movement of the drum 33. Thus a uniform and precise pattern will be transferred to all the grip handles processed by the apparatus shown.

The motion of the drum 33 is transmitted to the work pieces 25 through the shaft 20, and the cutting tools 68 groove the work pieces 25 accordingly. It is to be noted that the resilient mounting which yieldingly urges the motors 70 toward the work pieces 25 automatically adapts the apparatus to the surface contours of variously and irregularly shaped work pieces. As each work piece 25 moves relative to its cutting tool 68, the corresponding blunt-tipped nose guard 71 follows the contours of the work piece 25 and at the same time allows the tool 68 to cut a pattern of a predetermined and uniform depth.

It will be apparent that many features of the preferred embodiment of my invention shown and described above may be changed without departing from the spirit of my invention. For example, among other things, the pattern marking instruments 68 need not be rotary cutting tools. They may be replaced by electrical engraving tools, painting tools or other marking instruments. Similarly, the motors 70 may be electric or hydraulic motors instead of the pneumatic motors here disclosed and they may be slidably mounted for movement to and from the work pieces 25. Also, rather than a pair of pattern marking instruments 68 at each work position 20A of the shaft 20, it is feasible for particular purposes to circumferentially mount several pattern marking instruments about the axis of the shaft 20 so as to simultaneously make a pattern on several work pieces also circumferentially mounted on the shaft 20 at each work position 20A. Also, the shaft 20 may be extended or reduced in length to provide any desirable number of work positions 20A.

The knurled pattern 42 is obviously a single example of one of practically unlimited patterns for which the apparatus of the present invention is adapted. The relief pattern 42 on the drum 33 may even be supplanted by a plane surface picture pattern to be traced by a stylus or other suitable follower or tracing means.

Furthermore, the cylindrical rotatable drum 33 is not essential to the operation of my invention. For particular requirements, drums of various shapes may be employed, and the mounting of the drum may be varied to permit three directional rectilinear movement or rotative movement about an axis in any direction. In fact, the drum may be mounted stationarily so that relative movement between the drum and the follower or tracing member 41 may be accomplished by movement of the said follower 41. Correspondingly, the coupling between the drum and the work pieces will be adapted to transmit such other relative motions of the drum to the work pieces, or may be adapted to magnify, reduce or otherwise change the master pattern in its transfer to the surface of the work pieces.

From the foregoing, it will be seen that I have provided a new and useful machine for duplicating patterns simultaneously on the surfaces of a multiplicity of work pieces, the apparatus being particularly adapted to follow the surface contours of variously shaped articles and to apply mass production methods to the making of a predetermined uniform and precise pattern on such articles.

I claim:

1. In a machine for marking a pattern on a workpiece, the combination of a workholder and a marking instrument mounted for relative movement therebetween, a master pattern and a pattern follower mounted for relative movement therebetween, means for transmitting said relative movement of said master pattern and pattern follower to said workholder and marking instrument, said master pattern having crossing lineations on the surface thereof and said pattern follower having a portion adapted to move within said lineations on the surface of said master pattern to control said relative movement thereof, and a collar adjustably mounted on said master pattern and fixed thereto in any of its adjusted positions to provide a raised limiting boundary for the relative movement of said pattern follower and said master pattern said limiting boundary provided by said collar being spaced from the ends of a portion of said lineations to form a relief strip to guide said pattern follower between adjacent lineations, said pattern follower having an elongated tracing edge adapted to move within said lineation only in the direction of the elongations thereof and also adapted to move broadside within said strip.

2. In a machine for marking a pattern on a workpiece, the combination of a workholder and a marking instrument mounted for relative movement therebetween, a master pattern and a pattern follower mounted for relative movement therebetween, said master pattern having raised portions forming crossing lineations and also having a border portion at the ends of said lineations, the margin formed by the ends of said lineations including a V-shaped margin portion, a collar mounted on the border portion of said master pattern and having angular edge portions corresponding to said margin, said collar being positioned on said master pattern having said angular edge portions in mating relationship with the V-shaped portion of the margin of said master pattern and also having only the angular edge portions which extend in one direction spaced from the corresponding portions of the V-shaped margin portion to form a limiting boundary for relative movement of said pattern follower over said master pattern, said last mentioned angular edge portions also cooperating with the raised portions of said master pattern which form the corresponding portion of said V-shaped margin to form a relief strip to guide said pattern follower between the ends of said lineations, said pattern follower having an elongated tracing edge adapted to move within said lineations only in the direction of the elongation thereof and also adapted to move broadside within said strip, and means for transmitting said relative movement of said master pattern and pattern follower to relative movement between said workholder and marking instrument, said collar being adjustable relative to said master pattern to space the other said angular edge portions from the corresponding V-shaped margin portions of said master pattern.

3. In a machine for marking a pattern in a workpiece, the combination of a workholder and a marking instrument mounted for translatory and rotatory movement therebetween, a master pattern and a pattern follower mounted for translatory and rotatory movement therebetween, means for transmitting said relative translatory and rotatory movement of said master pattern and pattern follower to relative translatory and rotatory movement between said work holder and marking instrument, said master pattern having raised portions forming crossing lineations and also having a border portion at the ends of said lineations, the margin formed by the ends of said lineations including a V-shaped margin portion, a collar mounted on the border portion of said margin, said collar being positioned on said master pattern in mating relationship with the V-shaped portion of the margin formed by said raised portions of said master pattern and also having only the angular edge portions which extend in one direction spaced from the corresponding portion of the V-shaped margin portion to form a limiting boundary for relative movement of said pattern follower over said master pattern, said last mentioned angular edge portions also cooperating with the raised portions of said master pattern which form the corresponding portion of the V-shaped margin to form a relief strip to guide said pattern follower between the ends of said lineations, said pattern follower having an elongated tracing edge adapted to move within said lineations only in the direction of the elongation thereof and also adapted to move broadside within said strip, said collar being adjustable relative to said master pattern to space the other said angular edge portions from the corresponding portion of the margin of said master pattern.

4. In a machine for marking a pattern on a workpiece, the combination of a workholder and pattern marking instrument mounted for translatory and rotatory movement therebetween, a master pattern and a pattern follower mounted for translatory and rotatory movement therebetween, said master pattern having raised portions forming crossing lineations, a collar adjustably mounted on said master pattern and fixed thereto in any of its adjusted positions, said collar having an edge portion providing a raised limiting boundary for the relative movement of said pattern follower and master pattern, said limiting boundary provided by said collar being spaced from the ends of a portion of said lineations to form a relief strip to guide said pattern follower between adjacent lineations, said pattern follower having an elongated tracing edge adapted to move within said lineations only in the direction of the elongations thereof and also adapted to move broadside within said strip, and means for transmitting said relative movement of said master pattern and said pattern follower to said workholder and marking instrument.

HERBERT F. DIES.

REFERENCES CITED

The following references are of record in the file of this patent:

UNITED STATES PATENTS

| Number | Name | Date |
| --- | --- | --- |
| 19,607 | Hope | Mar. 9, 1858 |
| 104,584 | Hardy | June 21, 1870 |
| 134,498 | Von Hofe | Dec. 31, 1872 |
| 303,994 | Foster et al. | Aug. 26, 1884 |
| 410,678 | Sachs | Sept. 10, 1889 |
| 558,951 | Hodges | Apr. 28, 1896 |
| 1,832,255 | Springstead | Nov. 17, 1931 |
| 1,900,203 | Seiler | Mar. 7, 1933 |
| 2,132,452 | Zwick | Oct. 11, 1938 |
| 2,240,825 | Alexander | May 6, 1941 |

FOREIGN PATENTS

| Number | Country | Date |
| --- | --- | --- |
| 320,929 | Germany | May 11, 1920 |
| 597,481 | Germany | May 25, 1934 |